2,799,583
Patented July 16, 1957

2,799,583
ENSILAGE

Jay C. Harris, Dayton, Ohio, assignor to Monsanto Chemical Company, St. Louis, Mo., a corporation of Delaware No Drawing. Application May 21, 1954,
Serial No. 431,604

6 Claims. (Cl. 99—8)

This invention relates to a modified ensilage, and to a process for the preservation of ensilage and the prevention of corrosion when the ensilage is in contact with ferruginous containers.

An object of this invention is to provide a process for treating ensilage. A further object is to provide a composition which will maintain the nutritive value of ensilage while at the same time resisting the corrosion of iron and steel equipment used in the preparation and storage of the said ensilage.

In prior known processes for treating ensilage, it has been the custom to treat certain types of vegetation with various chemical compounds in order to control the character of fermentation occurring on storage in silos, etc. It has been found that the use of alkali metal and alkaline earth metabisulfites is particularly valuable for this purpose, although a disadvantage of the use of metabisulfites is the corrosivity of the treated ensilage, particularly against ferruginous materials.

It has now been discovered that ensilage treated with alkali metal and alkaline earth metabisulfites, generally referred to as alkaline metabisulfites such as sodium, potassium, calcium or magnesium bisulfites may be rendered less corrosive by the combination therewith of urea. It has been found that the urea and metabisulfite may be added to ensilage in solid form or as a solution without serious corrosion upon the ensilage cutting and conveying equipment, and furthermore that exposure of the thus treated ensilage to steel or iron surfaces greatly reduces the corrosive effects during storage.

For the purpose of preservation of ensilage such as may be made from grasses and legumes, it has been found possible to add urea and the metabisulfite in solid form or in solution in water. However, it is not necessary to add water in the production of the ensilage, although water may be added if desired. The urea may be added at the same time that the metabisulfite such as sodium or calcium metabisulfite is added to the ensilage or these two components may be employed separately in either order.

A secondary advantage in the use of urea in the present combination is the increased nutritive value of the treated ensilage, since the urea supplies readily assimilable nitrogen as a component of the animal feed. It has been found that the urea does not suppress proteolytic fermentation so that there is no reduction of the development of desirable lactic acid fermentation in the ensilage. It has also been found that the use of urea in the combination of ensilage with alkaline metabisulfites reduces corrosion of the metal parts of the ensilage cutter or other metallic parts of the ensilage preparing apparatus with which the hydrated fodder may come into contact. The resultant ensilage product is non-toxic to the animals that consume it, free from bad odors or tastes which would cause the animals to reject it and produces no distasteful or malodorous qualities in milk from herds to which the said ensilage is fed. The proportion of the metabisulfite employed as a preservative in the present invention is not critical but may vary from 0.1% to 10% by weight. Urea is employed in the proportion of 0.5% to 5% relative to the weight of the metabisulfite. Thus, the urea content may vary from 0.0005% to 0.5% by weight. For example, ensilage may be prepared from soybean meal containing about 0.7% moisture. The meal is mixed in an ensilage cutter, for example, while adding 0.01% by weight of urea and 1% by weight of sodium metabisulfite. These dosage levels represent 8 pounds per ton of silage. The above composition when stored in a container made of mild, hot-rolled sheet iron was found to be substantially noncorrosive, although a similar composition prepared without the use of urea was extremely corrosive to the same sheet iron. Other proteinaceous materials such as alfalfa or clover or soybeans may similarly be employed.

In order to test the efficacy of the use of urea in combination with metabisulfites, mixtures were prepared with (a) dry components, and (b) with 4% water content. The sodium metabisulfite employed in this series of tests was present in 1% concentration by weight, and the urea when present was used at 0.01% concentration. The treated specimens were maintained in contact with test coupons of mild steel for a period of one week. The dry mix was tested at 95% relative humidity, and the 4% liquid test was maintained in a closed vessel. The change in weight of the test coupons was measured and compared to similar tests using only the sodium metabisulfite. These data are summarized below:

| Treatment | Percent Urea | Percent Change in Weight of Duplicate Coupons |
|---|---|---|
| (a) Dry | 1.0 | −0.07 |
|  | none | −0.62 |
| (b) 4% water present | 1.0 | −0.02 |
|  | none | −0.51 |

The above data indicate that the presence of the alkaline metabisulfite with urea greatly reduces corrosivity of silage against ferruginous materials.

What is claimed is:

1. A process of preserving ensilage comprising adding to ensilage an alkaline metabisulfite and urea.

2. Process for preserving ensilage comprising adding to ensilage an alkaline metabisulfite in the proportion of 0.1% to 10% by weight and urea in the proportion of 0.5% to 5% relative to the weight of the said metabisulfite.

3. Process for preserving ensilage comprising adding to ensilage 0.1% to 10% by weight of sodium metabisulfite and urea in the proportion of 0.5% to 5% relative to the weight of the said metabisulfite.

4. Modified ensilage comprising ensilage of the grass or leguminous type containing approximately 0.1% to 10% by weight of an alkaline metabisulfite and urea in the proportion of 0.5% to 5% relative to the said metabisulfite.

5. Modified ensilage comprising ensilage of the grass or leguminous type containing approximately 0.1% to 10% by weight of sodium metabisulfite and urea in the proportion of 0.05% to 5% relative to the said metabisulfite.

6. Modified ensilage comprising ensilage of the grass or leguminous type containing an alkaline metabisulfite and urea in an amount substantially to inhibit corrosion of ferruginous materials.

References Cited in the file of this patent

UNITED STATES PATENTS 2,160,168    Pfeiffer    May 30, 1939